United States Patent
Tanaka et al.

(10) Patent No.: US 12,142,258 B2
(45) Date of Patent: Nov. 12, 2024

(54) SEQUENCE LABELING APPARATUS, SEQUENCE LABELING METHOD, AND PROGRAM

(71) Applicant: NIPPON TELEGRAPH AND TELEPHONE CORPORATION, Tokyo (JP)

(72) Inventors: Tomohiro Tanaka, Tokyo (JP); Ryo Masumura, Tokyo (JP); Takanobu Oba, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 445 days.

(21) Appl. No.: 17/425,246

(22) PCT Filed: Jan. 10, 2020

(86) PCT No.: PCT/JP2020/000696
§ 371 (c)(1),
(2) Date: Jul. 22, 2021

(87) PCT Pub. No.: WO2020/153159
PCT Pub. Date: Jul. 30, 2020

(65) Prior Publication Data
US 2022/0093079 A1 Mar. 24, 2022

(30) Foreign Application Priority Data
Jan. 24, 2019 (JP) ................. 2019-009891

(51) Int. Cl.
*G10L 15/02* (2006.01)
*G10L 15/16* (2006.01)
*G10L 15/22* (2006.01)

(52) U.S. Cl.
CPC .............. *G10L 15/02* (2013.01); *G10L 15/22* (2013.01); *G10L 15/16* (2013.01)

(58) Field of Classification Search
CPC .......... G10L 15/02; G10L 15/22; G10L 15/16
See application file for complete search history.

(56) References Cited

U.S. PATENT DOCUMENTS

2015/0066496 A1* 3/2015 Deoras .................... G10L 15/16
704/232
2021/0035552 A1* 2/2021 Grizzel ................. G06F 3/0346

OTHER PUBLICATIONS

He, W., Wang, W., & Livescu, K. (2016). Multi-view recurrent neural acoustic word embeddings. arXiv preprint arXiv:1611.04496.*

(Continued)

*Primary Examiner* — Bryan S Blankenagel

(57) ABSTRACT

Without dividing speech into a unit such as a word or a character, text corresponding to the speech is labeled. A speech distributed representation sequence converting unit 11 converts an acoustic feature sequence into a speech distributed representation. A symbol distributed representation converting unit 12 converts each symbol included in the symbol sequence corresponding to the acoustic feature sequence into a symbol distributed representation. A label estimation unit 13 estimates a label corresponding to the symbol from the fixed-length vector of the symbol generated using the speech distributed representation, the symbol distributed representation, and fixed-length vectors of previous and next symbols.

7 Claims, 2 Drawing Sheets

(56) References Cited

OTHER PUBLICATIONS

Chiu et al. (2016) "Named Entity Recognition with Bidirectional LSTM-CNNs" Transactions of the Association for Computational Linguistics (TACL), vol. 4, pp. 357-370.
Wang et al. (2018) "Discourse Marker Detection for Hesitation Events on Mandarin Conversation" In Proc. Annual Conference of the International Speech Communication Association(INTERSPEECH), Sep. 2, 2018, pp. 1721-1725.

* cited by examiner

SEQUENCE LABELING APPARATUS, SEQUENCE LABELING METHOD, AND PROGRAM

CROSS-REFERENCE TO RELATED APPLICATIONS

This application is a U.S. 371 Application of International Patent Application No. PCT/JP2020/000696, filed on 10 Jan. 2020, which application claims priority to and the benefit of JP Application No. 2019-009891, filed on 24 Jan. 2019, the disclosures of which are hereby incorporated herein by reference in their entireties.

TECHNICAL FIELD

This invention relates to a sequence-labeling technique for text.

BACKGROUND ART

As a technique for performing sequence-labeling on text, a bidirectional recurrent neural network (RNN) is widely used (for example, see Non Patent Literature 1). The bidirectional RNN is a neural network that can account for the context of an entire text. In sequence-labeling using the bidirectional RNN, input symbols (characters or words) each are converted to a fixed-length continuous value vector, and labeling is performed on each of the symbols while taking into account previous and next contexts. Here, a case where K types of labels $\{l_1, l_2, \ldots, l_k, \ldots, l_K\}$ are given will be described. In a case where an input symbol sequence is represented as $\{c_1, c_2, \ldots, c_s, \ldots, c_S\}$, the probability of a label for a symbol $c_s$ in the sequence is estimated as follows.

$$E_s = \text{EMBEDDING}(c_s)$$

$$\vec{h}_s = NN(E_s, \vec{h}_{s-1}), \overleftarrow{h}_s = NN(E_s, \overleftarrow{h}_{s+1})$$

$$h_s = \text{CONCAT}(\vec{h}_s, \overleftarrow{h}_s)$$

$$O_s = \text{DISTRIBUTE}(h_s) \quad \text{[Math. 1]}$$

Here, $E_s$ is a distributed representation of the symbol $c_s$. $NN(\cdot)$ is a function having the function of a neural network (NN). $\vec{h}_s$ and $\overleftarrow{h}_s$ are fixed-length continuous value vectors obtained by converting the distributed representation of the symbol by NN. $h_s$ is a fixed-length continuous value vector that concatenates the two vectors, $\vec{h}_s$ and $\overleftarrow{h}_s$. Hereinafter, $\vec{h}_s$ is also referred to as a positive fixed-length vector, and $\overleftarrow{h}_s$ is also referred to as a negative fixed-length vector. $O_s$ is an output representing a probability corresponding to each of all labels.

EMBEDDING(·) is a function having the function of converting a symbol into a fixed-length vector, and, for example, a linear conversion function is applicable. CONCAT(·) is a function of concatenating a plurality of vectors, and a differentiable function that can convert a plurality of vectors into a vector is applicable. DISTRIBUTE(·) is a function of calculating an occurrence probability of each of all labels from a vector that has been made fixed-length, and, for example, a softmax function is applicable. The softmax function is a known technique, and thus the description thereof is omitted here. In the $O_s$ calculated above, the probabilities for all labels are calculated, and a value corresponding to a label $l_k$ is made a probability that the label $l_k$ is assigned as a label for the symbol $c_s$.

As a method of using acoustic information and language information in combination, there is a method in which an acoustic signal is divided into a unit such as a word or a character to be used (for example, see Non Patent Literature 2). In such a method, association between acoustic signals and text is acquired in advance, and a subsequent-stage processing such as labeling is performed. As a simple method, an acoustic signal can be divided by using a speech recognition system constructed in advance to perform speech recognition once.

CITATION LIST

Non Patent Literature

Non Patent Literature 1: Jason P. C. Chiu and Eric. Nichols, "Named entity recognition with bidirectional LSTM-CNNs," Transactions of the Association for Computational Linguistics (TACL), vol. 4, pp. 357-370, 2016.

Non Patent Literature 2: Yu-Wun Wang, Hen-Hsen Huang, Kuan-Yu Chen, and Hsin-Hsi Chen, "Discourse marker detection for hesitation events on mandarin conversation," In Proc. Annual Conference of the International Speech Communication Association (INTERSPEECH), pp. 1721-1725, 2018.

SUMMARY OF THE INVENTION

Technical Problem

In order to divide an acoustic signal into a unit such as a word or a character, a system such as a speech recognition system needs to be constructed in advance. However, this method needs to separately optimize a model for associating speech with text and a model for labeling, and thus very accurate association is required. In addition, it costs much to separately construct models or separately perform tuning, which is a problem.

In light of the technical problems described above, an object of the present invention is to achieve a sequence-labeling technique that enables labeling of text corresponding to speech without dividing the speech into a unit such as a word or a character.

Means for Solving the Problem

In order to solve the above-described problems, a sequence-labeling apparatus according to an aspect of the present invention includes: a speech distributed representation sequence converting unit configured to convert an acoustic feature sequence into a speech distributed representation; a symbol distributed representation converting unit configured to convert each symbol included in a symbol sequence corresponding to the acoustic feature sequence into a symbol distributed representation and a label estimation unit configured to estimate a label corresponding to the symbol from a fixed-length vector of the symbol generated using the speech distributed representation, the symbol distributed representation, and fixed-length vectors of previous and next symbols.

Effects of the Invention

According to the sequence-labeling technique of the present invention, it is possible to label text corresponding to speech without dividing the speech into a unit such as a word or a character.

DESCRIPTION OF EMBODIMENTS

Figure 1:
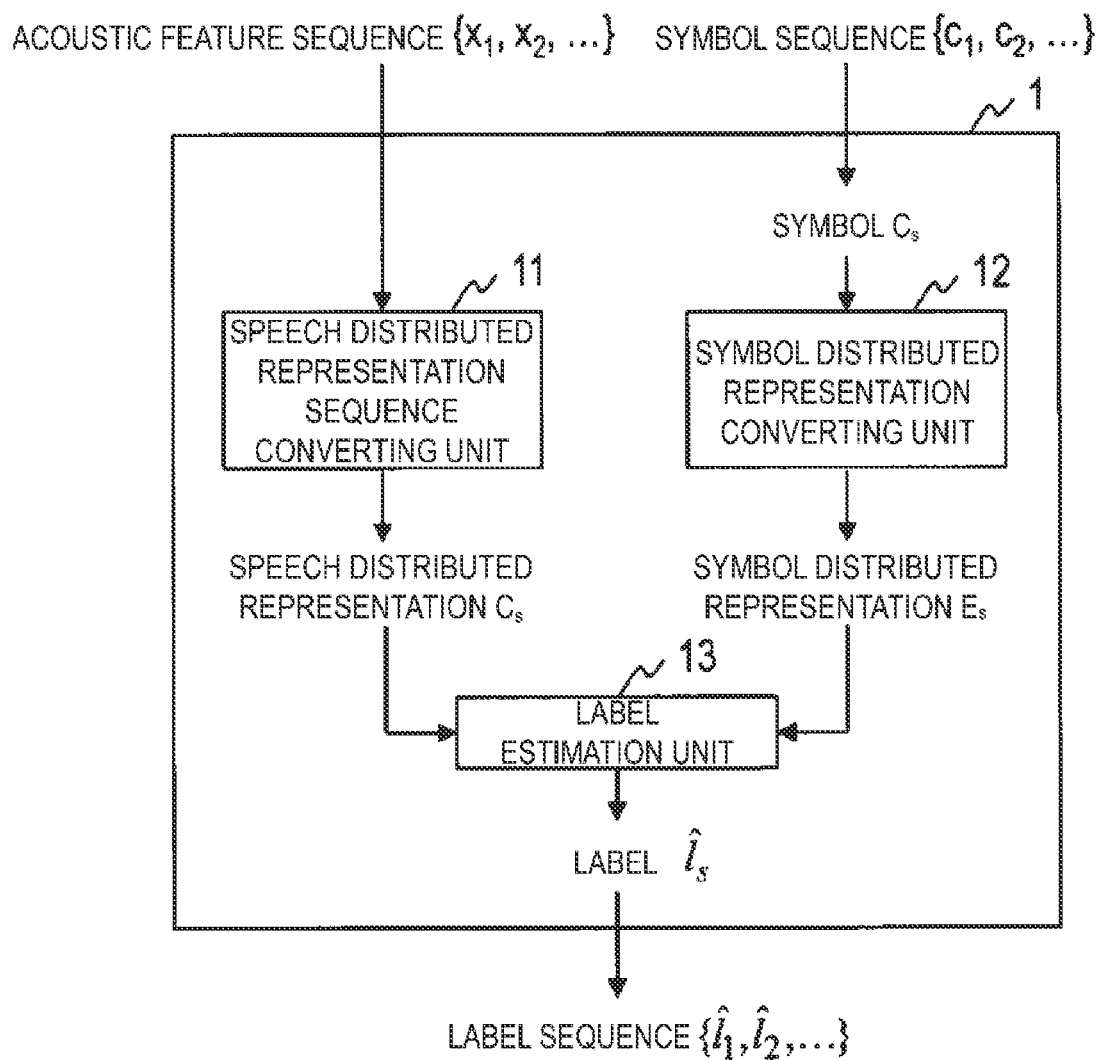
FIG. 1 is a diagram exemplifying a functional configuration of a sequence-labeling apparatus.

Hereinafter, embodiments of the present invention will be described in detail. In the drawings, the same reference numerals are given to constituent units that have the same functions and the repeated description will be omitted.

In the following description, symbols "→", "←", and "^" used in the text should originally be written directly above characters immediately before them, but are written immediately after the characters due to a limitation of text notation. In mathematical formulas, these symbols are written in their original positions, that is, directly above characters, For example, "a→" is expressed by the following formula in a mathematical formula:

$$\vec{a} \qquad [\text{Math. 2}]$$

In the present invention, the above-described problems are solved by using an attentional mechanism described in Reference 1 below. The attentional mechanism is one of techniques for a neural network and is utilized in a model that predicts another sequence having a different length from a sequence. It is known that an association relationship between two sequences can be learned at the same time. Utilizing this attentional mechanism allows text to be labeled while taking into account a relationship between speech and language.

Reference 1: Minh-Thang Luong, Hieu Pham, Christopher D. Manning, "Effective Approaches to Attention-based Neural Machine Translation", In Proc. EMNLP, pp. 1412-1421, 2015.

First Embodiment

The problem to be addressed by the present invention is to impart a label to each symbol (word or character) in text when a speech signal and the text corresponding thereto are provided.

Figure 2:
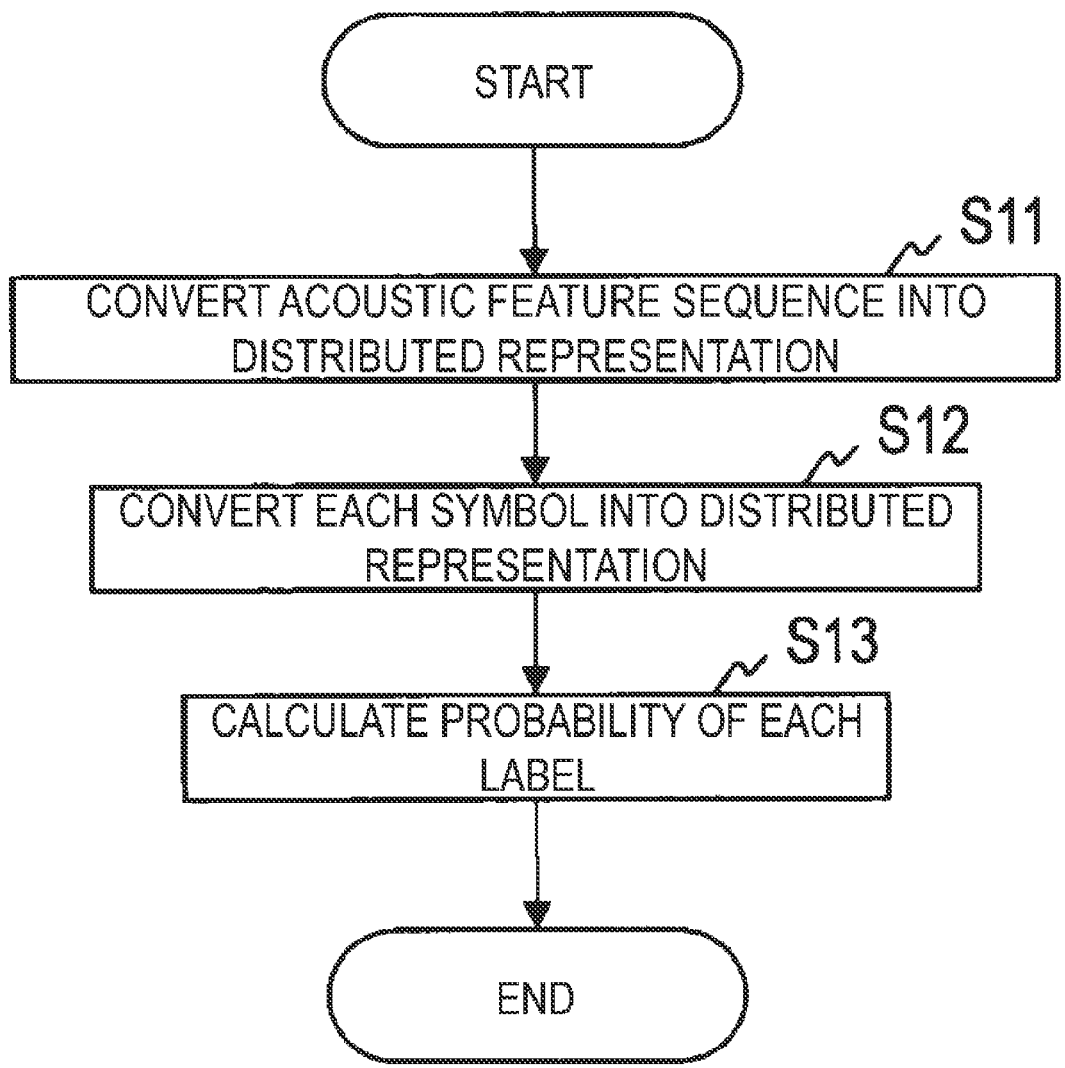
FIG. 2 is a diagram exemplifying a processing procedure of a sequence-labeling method.

A first embodiment of the present invention is a sequence-labeling apparatus and a method in which an acoustic feature sequence and a symbol sequence corresponding to the acoustic feature sequence are used as an input to output a label sequence in which each of symbols in the symbol sequence is labeled. As illustrated in FIG. 1, a sequence-labeling apparatus 1 according to the first embodiment is provided with a speech distributed representation sequence converting unit 11, a symbol distributed representation converting unit 12, and a label estimation unit 13. When the sequence-labeling apparatus 1 executes processing of each step exemplified in FIG. 2, the sequence-labeling method according to the first embodiment is realized.

The sequence-labeling apparatus 1 is a special apparatus constituted by, for example, a known or dedicated computer including a central processing unit (CPU), a main memory (random access memory: RAM), and the like into which a special program is read. The sequence-labeling apparatus 1, for example, executes each processing under control of the central processing unit. Data input to the sequence-labeling apparatus 1 and data obtained in each processing are stored in the main memory, for example, and the data stored in the main memory is read out as needed to the central processing unit to be used for other processing. At least a portion of processing units of the sequence-labeling apparatus 1 may be constituted with hardware such as an integrated circuit.

In step S11, the speech distributed representation sequence converting unit 11 uses an acoustic feature sequence that is an input of the sequence-labeling apparatus 1 as an input, and converts the acoustic feature sequence into one speech distributed representation and outputs the speech distributed representation. The speech distributed representation output by the speech distributed representation sequence converting unit 11 is input to the label estimation unit 13.

In a case where the acoustic feature sequence is denoted as $[x_1, x_2, \ldots, x_T]$ and a symbol in the corresponding symbol sequence is denoted as $c_s$, the speech distributed representation corresponding to the symbol $c_s$ is calculated as follows.

$$\vec{C}_s = NN(x_1, x_2, \ldots, x_T, \vec{h}_{s-1}), \overleftarrow{C}_s = NN(x_T, x_{T-1}, \ldots, x_1, \overleftarrow{h}_{s+1}) \qquad [\text{Math. 3}]$$

Here, $NN(\cdot)$ is a function having a function of converting a continuous value vector sequence of a variable length into a continuous value vector of a fixed length, any function is applicable as long as having the conversion function, and for example, RNN is applicable. $\vec{C}_s$ and $\overleftarrow{C}_s$ are fixed-length continuous value vectors converted by NN, and a different vector is calculated by an input order of the acoustic feature sequence $\{x_1, x_2, \ldots, x_T\}$. Hereinafter, $\vec{C}_s$ is also referred to as a positive speech distributed representation, and $\overleftarrow{C}_s$ is also referred to as a negative speech distributed representation. $\vec{h}_{s-1}$ and $\overleftarrow{h}_{s+1}$ are fixed-length continuous value vectors calculated by the label estimation unit 13 described below.

In step S12, the symbol distributed representation converting unit 12 uses symbols included in the symbol sequence which is an input of the sequence-labeling apparatus 1 as an input, and converts each of the symbols into a fixed-length distributed representation and outputs the fixed-length distributed representation. The symbol distributed representation output by the symbol distributed representation converting unit 12 is input to the label estimation unit 13.

In a case where a symbol sequence in text is represented as $\{c_1, c_2, \ldots, c_s, \ldots, cs\}$, the symbol distributed representation of a symbol $c_s$ is calculated as follows.

$$E_s = \text{EMBEDDING}(c_s) \qquad [\text{Math. 4}]$$

In step S13, the label estimation unit 13 uses the speech distributed representation $C_s$ output by the speech distributed representation sequence converting unit 11 and the symbol distributed representation $E_s$ output by the symbol distributed representation converting unit 12 as inputs, and estimates a label to be assigned to the symbol.

First, the fixed-length continuous value vectors $\vec{h}_s$ and $\overleftarrow{h}_s$ are calculated as follows.

$$\vec{h}_s = NN(E_s, \vec{h}_{s-1}, \vec{C}_s), \overleftarrow{h}_s = NN(E_s, \overleftarrow{h}_{s+1}, \overleftarrow{C}_s) \qquad [\text{Math. 5}]$$

Then, the calculated two vectors, $\vec{h}_s$ and $\overleftarrow{h}_s$, are coupled as follows, resulting in a vector $h_s$.

$$h_s = \text{CONCAT}(\vec{h}_s, \overleftarrow{h}_s) \qquad [\text{Math. 6}]$$

Finally, the coupled vector $h_s$ is used to calculate a probability $O_s$ that each label is assigned.

$$O_s = \text{DISTRIBUTE}(h_s) \qquad [\text{Math. 7}]$$

The label estimation unit 13 estimates the label $\hat{l}_s$ to be assigned to the symbol $c_s$ based on the calculated probability $O_s$ of the label.

The sequence-labeling apparatus 1 generates and outputs a labeling sequence $\{\hat{l}_1, \hat{l}_2, \ldots, \hat{l}_s, \ldots, \hat{l}_S\}$ in which each symbol is labeled by applying procedures of steps S11 to S13 to all the symbols $\{c_1, c_2, \ldots, c_s, \ldots, c_S\}$ in the input symbol sequence.

Second Embodiment

In a second embodiment, a label estimation method different from the first embodiment will be described. The calculation amount can be reduced in the method of the second embodiment compared to the method of the first embodiment. Hereinafter, differences from the first embodiment will be mainly described.

A speech distributed representation sequence converting unit 11 of the second embodiment calculates a speech distributed representation for an acoustic feature sequence as follows. Note that $h_{s-1}$ is a fixed-length continuous value vector calculated by a label estimation unit 13.

$$C_s = NN(x_1, x_2, \ldots, x_T, h_{s-1}) \qquad [\text{Math. 8}]$$

The label estimation unit 13 of the second embodiment calculates a probability $O_s$ of a label for a symbol $c_s$ as follows.

$$\vec{h}_s = NN(E_s, \vec{h}_{s-1}), \overleftarrow{h}_s = NN(E_s, \overleftarrow{h}_{s+1})$$

$$h_s = \text{CONCAT}(\vec{h}_s, \overleftarrow{h}_s)$$

$$g_s = NN(h_s, C_s)$$

$$O_s = \text{DISTRIBUTE}(g_s) \qquad [\text{Math. 9}]$$

Here, $g_s$ is a fixed-length continuous value vector corresponding to $h_s$ in the first embodiment.

Other procedures are perform in the same manner as in the first embodiment.

Third Embodiment

The sequence-labeling technique described in the first embodiment or the second embodiment can be used in the following settings.

(1) Use for Speech and Transcribed Text

In order to construct a speech recognition system, large quantities of sets of speech and transcribed text thereof are required. While the sets have been accumulated in large quantities, it is not practical to manually impart labels for various pieces of meta information to all data because of the large cost of imparting labels for various pieces of meta information. On the other hand, if meta information is imparted to the accumulated data, it is possible to construct a more advanced speech recognition system and a more advanced speech interactive system. In accordance with the first embodiment or the second embodiment, labeling transcribed text from the set of speech and transcribed text enables large quantities of data labeled with meta information to be generated.

(2) Use as Subsequent-Stage Processing of Speech Recognition

Speech and speech recognition results (text) can be used as inputs of the first embodiment or the second embodiment to be used as a subsequent processing of speech recognition. The speech recognition results include locations that are not necessary for understanding of meaning or a subsequent-stage processing, or are simply converted to text, and thus meta information falls out. In accordance with the first embodiment or the second embodiment, when the speech recognition results are labeled, it is possible to identify and delete unnecessary locations of the speech recognition results, and to provide information that falls out in speech recognition. In other words, it is possible to use labeling for purposes of shaping speech recognition results and sophisticating a subsequent-stage application of speech recognition.

The embodiments of the present invention have been described. A specific configuration is not limited to the embodiment and appropriate changes in the design are, of course, included in the present invention within the scope of the present invention without departing from the gist of the present invention. The various steps of the processing described in the embodiments is executed sequentially in the described order and may also be executed in parallel or separately as necessary or in accordance with a processing capability of the device that performs the processing.

Program and Recording Medium

When various processing functions in the apparatuses described in the foregoing embodiment are realized by a computer, processing contents of the functions of the apparatuses are described in accordance with a program. When the program is executed by a computer, the various processing functions of the apparatuses are implemented on the computer.

The program in which the processing contents are described can be recorded on a computer-readable recording medium. The computer-readable recording medium can be any type of medium such as a magnetic recording device, an optical disc, a magneto-optical recording medium, or a semiconductor memory.

The program is distributed, for example, by selling, giving, or lending a portable recording medium such as a DVD or a CD-ROM with the program recorded on it. Further, the program may be stored in a storage device of a server computer and the program is transmitted from the server computer to another computer via a network, so that the program is distributed.

For example, a computer executing the program first temporarily stores a program recorded on a portable recording medium or a program transmitted from a server computer in an own storage device. When processing is executed, the computer reads the program stored in the own storage device and executes the processing in accordance with the read program. As another execution form of the program, the computer may directly read a program from a portable recording medium and execute a program in accordance with the program. Further, the computer executes processing in order in accordance with the received program whenever a program is transmitted from a server computer to the computer. In another configuration, the processing may be executed through a so-called application service provider (ASP) service in which functions of the processing are implemented just by issuing an instruction to execute the program and obtaining results without transmission of the program from the server computer to the computer. The program in this form is assumed to include a program which is information provided for processing of a computer and is equivalent to a program (data or the like that has characteristics regulating processing of the computer rather than a direct instruction for a computer).

In this form, the sequence-labeling apparatus is configured by executing a predetermined program on a computer. However, at least a part of the processing contents may be realized by hardware.

REFERENCE SIGNS LIST

1 Sequence-labeling apparatus
11 Speech distributed representation sequence converting unit
12 Symbol distributed representation converting unit
13 Label estimation unit

The invention claimed is:

1. A sequence-labeling apparatus comprising a processor configured to execute operations comprising:
receiving a pair of voice audio data and text data, wherein the voice audio data includes an acoustic feature sequence, and the text data corresponds to the voice audio data in textual form;
converting the acoustic feature sequence to a speech distributed representation;
converting each of symbols included in a symbol sequence corresponding to the acoustic feature sequence into a symbol distributed representation, wherein the symbol sequence includes a symbol, a previous symbol that is previous to the symbol, a next symbol that is next to the symbol, and the symbol represents a text in the text data;
estimating a label corresponding to a symbol of the symbol sequence from a fixed-length vector of the symbol, wherein the fixed-length vector is generated using the speech distributed representation, the symbol distributed representation, and fixed-length vectors of previous and next symbols, and the estimating the label further comprises iteratively storing the label in a memory device, and the memory device stores previously estimated labels of a label sequence;
generating an association between the label sequence and the symbol sequence of the text data corresponding to the voice audio data;
identifying unnecessary locations of the text data based on the generated association between the label sequence and the symbol sequence; and
deleting the unnecessary locations.

2. The sequence-labeling apparatus according to claim 1, wherein the converting the acoustic feature sequence further comprises:
generating a positive speech distributed representation generated using the acoustic feature sequence and a positive fixed-length vector of the previous symbol, and
generating a negative speech distributed representation generated using the acoustic feature sequence and a negative fixed-length vector of the next symbol, and the estimating further comprises:
coupling a positive fixed-length vector of the symbol and a negative fixed-length vector of the symbol, wherein the positive fixed-length vector of the symbol is generated using the positive speech distributed representation, the symbol distributed representation, and the positive fixed-length vector of the previous symbol, and the negative fixed-length vector of the symbol is generated using the negative speech distributed representation, the symbol distributed representation, and the negative fixed-length vector of the next symbol.

3. A computer-readable non-transitory recording medium storing a computer-executable program instructions that when executed by a processor a computer system to operations described in claim 2.

4. The sequence-labeling apparatus according to claim 1, wherein
the converting the acoustic feature sequence further comprises generating the speech distributed representation using the acoustic feature sequence and the fixed-length vector of the previous symbol; and
the estimating further comprises:
coupling a positive fixed-length vector of the symbol and a negative fixed-length vector of the symbol, wherein the positive fixed-length vector of the symbol is generated using the symbol distributed representation and a positive fixed-length vector of the previous symbol, and the negative fixed-length vector of the symbol is generated using the symbol distributed representation and a negative fixed-length vector of the next symbol; and
estimating a label corresponding to the symbol from a fixed-length vector generated using the speech distributed representation and the fixed-length vector of the symbol.

5. A computer-readable non-transitory recording medium storing a computer-executable program instructions that when executed by a processor a computer system to execute operations described in claim 4.

6. A computer-readable non-transitory recording medium storing a computer-executable program instructions that when executed by a processor cause a computer system to execute operations described in claim 1.

7. A computer implemented method for sequence-labeling, comprising:
receiving a pair of voice audio data and text data, wherein the voice audio data includes an acoustic feature sequence, and the text data corresponds to the voice audio data in textual form;
converting, the acoustic feature sequence to a speech distributed representation;
converting each of symbols included in a symbol sequence corresponding to the acoustic feature sequence into a symbol distributed representation, wherein the symbol sequence includes a symbol, a previous symbol that is previous to the symbol, a next symbol that is next to the symbol, and the symbol represents a text in the text data;
estimating a label corresponding to a symbol of the symbol sequence from a fixed-length vector of the symbol, wherein the fixed-length vector is generated using the speech distributed representation, the symbol distributed representation, and fixed-length vectors of previous and next symbols, and the estimating the label further comprises iteratively storing one or more labels including the label in a memory device, and the memory device stores previously estimated labels of a label sequence;
generating an association between the label sequence and the symbol sequence of the text data corresponding to the voice audio data;
identifying unnecessary locations of the text data based on the generated association between the label sequence and the symbol sequence; and
deleting the unnecessary locations.

* * * * *